US009150306B2

(12) United States Patent
Couderc et al.

(10) Patent No.: US 9,150,306 B2
(45) Date of Patent: Oct. 6, 2015

(54) CONTROL LEVER FOR CONTROLLING A ROTARY WING, A MECHANICAL CONTROL SYSTEM INCLUDING SAID CONTROL LEVER, AND AN AIRCRAFT

(75) Inventors: Gérard Couderc, Vitrolles (FR); Romuald Biest, Lauris (FR)

(73) Assignee: Airbus Helicopters, Marignane Cedex (FR)

( * ) Notice: Subject to any disclaimer, the term of this patent is extended or adjusted under 35 U.S.C. 154(b) by 554 days.

(21) Appl. No.: 13/437,420

(22) Filed: Apr. 2, 2012

(65) Prior Publication Data

US 2012/0255386 A1 Oct. 11, 2012

(30) Foreign Application Priority Data

Apr. 6, 2011 (FR) .................................... 11 01031

(51) Int. Cl.
*B64C 27/56* (2006.01)
*B64C 27/54* (2006.01)
*B64C 13/30* (2006.01)
*B64C 13/40* (2006.01)
*G05G 9/047* (2006.01)

(52) U.S. Cl.
CPC ................. *B64C 27/54* (2013.01); *B64C 13/30* (2013.01); *B64C 13/40* (2013.01); *B64C 27/56* (2013.01); *G05G 9/047* (2013.01); *Y10T 74/20201* (2015.01)

(58) Field of Classification Search
CPC ........ B64C 13/12; B64C 27/56; B64C 13/28; B64C 13/30; B64C 27/59; B64C 11/30; B64C 27/605; G05G 9/047; G05G 9/04788; G05G 2009/04714

USPC ........... 244/234, 237, 221, 17.11, 17.25, 228, 244/229; 74/491, 523, 471 XY
See application file for complete search history.

(56) References Cited

U.S. PATENT DOCUMENTS

| 1,550,739 | A | | 8/1925 | Pescara |
| 3,999,726 | A | | 12/1976 | Carlson et al. |
| 5,125,602 | A | * | 6/1992 | Vauvelle ......................... 244/223 |
| 5,853,152 | A | * | 12/1998 | Evans et al. ................... 244/221 |
| 6,390,412 | B1 | * | 5/2002 | Stevens ....................... 244/17.13 |

(Continued)

FOREIGN PATENT DOCUMENTS

| DE | 19524282 A | 4/1995 |
| DE | 19524282 A1 | 1/1997 |

OTHER PUBLICATIONS

Search Report and Written Opinion; Application No. FR 1101031; dated Dec. 15, 2011.

(Continued)

*Primary Examiner* — Benjamin P Lee
(74) *Attorney, Agent, or Firm* — Brooks Kushman P.C.

(57) ABSTRACT

A control lever (10) provided with a stick (11) extending axially from a stand (11') towards grip means (11") and with a carrier structure (20) for said stick (11) that is hinged about a first hinge axis (AX1) and about a second hinge axis (AX2). The control lever (10) includes phasing means (30) constrained to move in rotation with said stick (11) about said first hinge axis (AX1) and about said second hinge axis (AX2), said phasing means (30) comprising at least three main arms (31, 32, 33), each for controlling a respective power member (8', 8", 8''') that is connected to a set (6) of swashplates for controlling a rotary wing (2).

20 Claims, 3 Drawing Sheets

(56) References Cited

U.S. PATENT DOCUMENTS

| | | | |
|---|---|---|---|
| 8,087,619 B2* | 1/2012 | Hanlon et al. | 244/223 |
| 8,590,843 B2* | 11/2013 | Biest et al. | 244/234 |
| 2009/0230252 A1 | 9/2009 | Daunois | |
| 2010/0071496 A1* | 3/2010 | Hanlon et al. | 74/471 XY |
| 2012/0234985 A1* | 9/2012 | Biest et al. | 244/234 |
| 2013/0256463 A1* | 10/2013 | Antraygue | 244/234 |

OTHER PUBLICATIONS

Korean Notice of Reason for Rejection Dated Oct. 1, 2013, E.M. Hwang & Partners, Application No. 2012-0035637, Applicant Eurocopter, 4 Pages.

\* cited by examiner

CONTROL LEVER FOR CONTROLLING A ROTARY WING, A MECHANICAL CONTROL SYSTEM INCLUDING SAID CONTROL LEVER, AND AN AIRCRAFT

CROSS REFERENCE TO RELATED APPLICATIONS

The present application claims priority to French patent application FR 11/01031 filed on Apr. 6, 2011, the disclosure of which is incorporated in its entirety by reference herein.

BACKGROUND OF THE INVENTION (1) Field of the Invention

The present invention relates to a control lever for controlling a rotary wing, to a mechanical control system including said lever, and to an aircraft fitted with said control system.

The invention lies in the field of aircraft, in particular rotorcraft, and it relates more particularly to flight control systems that are actuated by a human pilot to control a rotary wing aircraft, more particularly in pitching and in roll. More specifically, the invention relates to control levers for controlling the flight directions of an aircraft, and in particular for modifying the pitch of the blades of the rotary wing fitted to a rotorcraft. In particular, the invention provides a cyclic stick for mechanical transmission of commands, which stick is of a structure that is axially compact.

(2) Description of Related Art

Rotorcraft are commonly fitted with manually-operated control systems to enable a pilot to fly the rotorcraft.

Among such control systems, there is a cyclic control lever that enables the pilot to modify the pitch of the blades in cyclic manner in order to cause the rotorcraft to move in pitching and in roll, and a collective control lever that enables the pilot to modify the pitch of the blades collectively in order to control the rotorcraft in elevation.

The cyclic control lever is hinged to a frame, e.g. arranged in a box or the like, and it is mounted to move in tilting in two control directions that are associated with respective flight controls. The cyclic control lever is hinged to the frame via a distal fixed end, and it is provided at its proximal free end with a handle for gripping. The proximal end is the end of the control lever that can be manipulated by the pilot, while the distal fixed end is the end of the cyclic control lever that is remote from its proximal end.

The collective control lever and the cyclic control lever are generally connected to the blades via mechanical connections referred to as "linkages", which linkages are secured to a non-rotary swashplate of a set of control swashplates. The rotary swashplate in this set of control swashplates is itself mechanically connected to each blade via a pitch control rod.

More precisely, primary roll and pitching linkages connect a double hinge at a fixed end of a cyclic control lever to a mixing unit, with the mixing unit being connected to the non-rotary swashplate of the set of cyclic swashplates via secondary linkages. Furthermore, the collective control lever is connected to the mixing unit via a collective primary linkage. Under such circumstances, a flight control is connected to the rotary wing via a roll, pitching, or collective linkage that is itself provided in succession with a primary linkage followed by a secondary linkage.

A movement of the cyclic control lever gives rise to a movement of the primary linkage in roll or of the primary linkage in pitching, and consequently it gives rise to a movement of the corresponding secondary linkages via the mixing unit. In contrast, a movement of the collective control lever gives rise to a movement of the collective primary linkage and then to movements of all of the secondary linkages via the mixing unit.

Nevertheless, since the forces that need to be exerted to change the pitch of the blades are large, a servocontrol is generally arranged in each secondary linkage. For example, at least one servocontrol is provided for controlling pitching, referred to as the "pitching servocontrol" for convenience, and two servocontrols are provided for controlling roll, a left servocontrol and a right servocontrol.

When the pilot seeks to modify the collective pitch of the blades, the pilot acts on the collective control lever in order to cause all three servocontrols to raise or lower the set of controlling swashplates.

The pitch control rods are then all moved identically, thereby causing the pitch of all of the blades to vary by the same angle.

In contrast, in order to vary the cyclic pitch of the blades so as to direct the helicopter in a given direction, the pilot causes at least one servocontrol to move by tilting the cyclic control lever appropriately in the desired direction.

The set of controlling swashplates does not move vertically, but rather tilts relative to the mast of the main rotor. Each pitch control rod is thus moved as a function of the intended target so as to generate an appropriate cyclic variation in the pitch of each blade.

Furthermore, when moved cyclically, the set of controlling swashplates needs to tilt about two perpendicular axes. On a light rotorcraft in which the bending stresses on said sets of controlling swashplates are small, the points where the servocontrols are fastened to said sets of controlling swashplates are then located on said axes.

However, on a heavy rotorcraft, it is preferable for the servocontrols to be distributed uniformly, such that they are separated from one another by angles of 120°, assuming that the rotorcraft is fitted with three servocontrols.

The cyclic control lever is then connected via a primary roll linkage and a primary pitching linkage to phasing means that are separate from the cyclic control lever, with the phasing means being connected to the mixing unit via one mechanical connection per servocontrol.

An order for performing a roll or a pitching operation, sometimes referred to as a "pure order" by the person skilled in the art, is then transformed into a composite movement of all of the mechanical connections downstream from the phasing means. Under such circumstances, and strictly speaking, there is then no longer one roll control linkage and one pitching control linkage between the phasing means and the mixing unit. When three servocontrols are used, the three corresponding mechanical connections are sometimes referred to as the "front linkage", the "left linkage", and the "right linkage", depending on the positions of said three servocontrols.

In another aspect, the flight controls of a rotorcraft include pedals also controlling a secondary rotor in yaw by means of a yaw linkage that optionally passes via the mixing unit.

Cyclic control levers include long cyclic sticks or "columns" that are used mainly for transmitting controls manually, and short cyclic sticks that are used mainly for transmitting controls electrically. As an indication, the length of a long cyclic stick is about three to four times the length of a short cyclic stick.

A long cyclic stick has a considerable lever arm that is favorable to transmitting controls mechanically, thereby making it easy for the pilot to manipulate. The pilot then makes use of all of an arm for operating the long cyclic stick with an appropriate amount of force, and can feel directly the opposing forces generated by the remote power members against being operated.

A short stick, of small size, may be arranged on one side of the pilot so as to make the cockpit more ergonomic and release space in front of the pilot. Such a stick is sometimes called a "mini-stick" because of its size that is small compared with the size of a conventional long stick.

Ideally, a considerable compromise is achieved by using an axially short cyclic stick for controlling a rotary wing via a mechanical architecture. Nevertheless, such a mechanical architecture generates high levels of friction, with these friction forces being maximized by the presence of phasing means between the cyclic control lever and the mixing unit. It would then appear difficult to implement a short cyclic stick with mechanical transmission on a rotary wing aircraft, since the lever arm of such a stick would appear to be difficult to make compatible with such friction forces.

The state of the art includes the documents: DE 195 24 282, US 2009/230252, and U.S. Pat. No. 1,550,739.

Document DE 195 24 282 describes a control lever provided with a hinged short stick, said stick extending from a handle to a stand. The stand co-operates with linkages.

BRIEF SUMMARY OF THE INVENTION

An object of the present invention is to propose a control lever that is optimized to enable it to actuate mechanical means, even though the control lever is compact.

According to the invention, a control lever is provided with a stick extending axially from a stand towards grip means and with a carrier structure for the stick that is hinged about a first hinge axis and about a second hinge axis.

The control lever is remarkable in particular in that it includes phasing means constrained to move in rotation with the stick about the first hinge axis and about the second hinge axis, the phasing means comprising at least three main arms so that each main arm can control a respective power member that is connected to a set of swashplates for controlling a rotary wing, by transforming a pure order resulting from tilting of the stick about one of said hinge axes into a composite order given to each of the power members. By way of example, the power members are servocontrols provided with respective hydraulic valves.

The control lever is then of the "mini-stick" type and is compact compared with a long cyclic stick. Under such circumstances, the control lever may be arranged on one side relative to a pilot.

Furthermore, the control lever presents the feature of possessing phasing means incorporated therein. Consequently, there is no need to provide phasing means connected to a mixing unit, as in certain prior art installations.

The friction forces from the set of mechanical members going from the control lever to the power members are thus minimized. It thus becomes possible to use a stick with a minimized lever arm on an aircraft of considerable weight that is provided with mechanical flight controls, as opposed to electrical flight controls.

The control lever may include one or more of the following characteristics.

For example, the phasing means include two mutually orthogonal interlinking secondary arms for associating with an additional control lever.

This variant is appropriate for an aircraft having controls that can be operated by two pilots. One pilot may then operate the control lever and another pilot may operate the additional lever, the secondary arms enabling the control lever and the additional lever to be connected together.

Optionally the first secondary arm extends along the first hinge axis, with the second secondary arm extending along the second hinge axis.

In another aspect, the carrier structure may comprise a movable portion and a stationary portion connected together by means of a link comprising a first shaft and a second shaft, which shafts are mutually orthogonal.

The carrier structure is then of the universal joint type, with the link means being in the form of a spider. It should be observed that each shaft may be split into two elongate portions that are connected to a central portion that is preferably perforated.

Furthermore, the first shaft may extend along the first hinge axis and be hinged to the movable portion, and the second shaft may extend along the second hinge axis and be hinged to the stationary portion.

In a first embodiment, the phasing means are fastened to the stand of the stick.

In a preferred, second embodiment, the stand of the stick is fastened to a movable portion of the carrier structure, and the phasing means are fastened to the movable portion.

In addition to the control lever, the invention provides a control system provided with such a control lever.

Under such circumstances, the mechanical control system comprises a set of control swashplates suitable for being connected by pitch rods to blades of a rotary wing, the control system comprising a cyclic control lever for controlling a plurality of power members connected to the set of control swashplates, the control lever being provided with a stick extending axially from a stand towards grip means and a carrier structure carrying the stick hinged about a first hinge axis and about a second hinge axis.

The control lever is of the above-described type including phasing means constrained to move in rotation with the stick about the first hinge axis and about the second hinge axis, the phasing means having at least three main arms, each for controlling a power member.

This control system may include at least one of the following characteristics.

In particular, the control system may be provided with a control lever operable by a first pilot and with an additional lever operable by a second pilot, and the phasing means may include two mutually orthogonal interlinking secondary arms for associating with two orthogonal members of the additional control lever respectively via a first interlinking system and via a second interlinking system.

Furthermore, at least one of said interlinking systems may include an assistance system, such as a trim actuator and/or a force assistance actuator, for example.

In another aspect, the control system includes a mixing unit connected to the control lever via one primary linkage per primary arm for connecting each primary arm to the mixing unit, the mixing unit being connected to each power member via one secondary linkage per power member.

Furthermore, the control system may optionally include a collective pitch control member connected to the mixing unit.

In addition to a control system, the invention provides an aircraft provided with a rotary wing having a plurality of blades, the aircraft including such a control system for controlling the pitch of the blades of the rotary wing.

BRIEF DESCRIPTION OF THE SEVERAL VIEWS OF THE DRAWINGS

The invention and its advantages appear in greater detail from the following description of embodiments given by way of illustration with reference to the accompanying figures, in which.

DETAILED DESCRIPTION OF THE INVENTION

Figure 1:
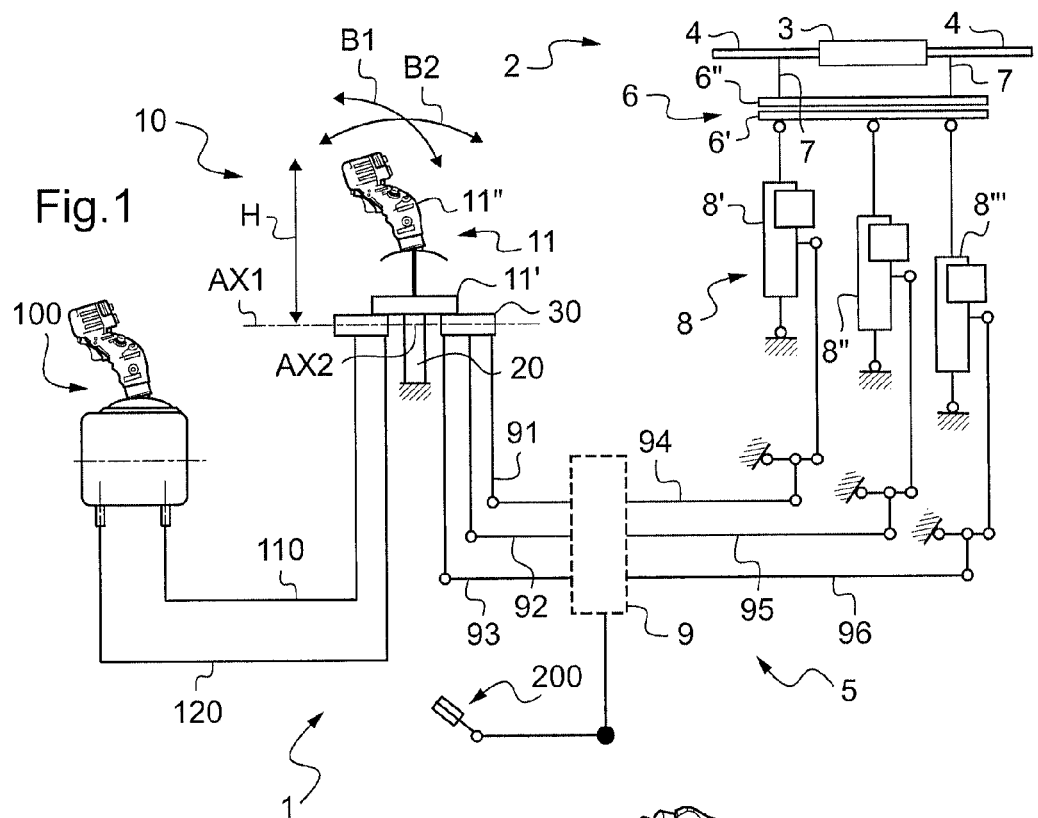
FIG. 1 is a diagram showing an aircraft in a first embodiment.

It should be observed that the term "figure" is replaced by "fig" in the drawings, for reasons of simplification.

FIG. 1 shows an aircraft 1 in a first embodiment, the aircraft being shown schematically to avoid pointlessly overloading FIG. 1. The aircraft 1 has a rotary wing 2 provided with a hub 3 carrying a plurality of blades 4. Under such circumstances, the aircraft 1 has a control system 5 for controlling the cyclic pitch of the blade 4, or indeed for controlling the collective pitch of said blades 4.

The control system 5 is a mechanical system controlling the pitch of the blades 4, and it comprises a set 6 of control swashplates, the set 6 including a non-rotary swashplate 6' that co-operates with a rotary swashplate 6" that is in turn connected to each of the blades 4 by a respective pitch rod 7. Such a set is sometimes known under the term "cyclic swashplate".

The control system 5 then includes a control lever 10 for cyclically controlling the pitch of the blades 4 by acting on the set 6 of control swashplates.

In order to minimize the forces needed to operate the control lever 10, the control lever 10 acts on a plurality of power members 8. More precisely, the control lever may act on a hydraulic valve of a power member of the hydraulic servo-control type.

For example, the control system 5 includes three power members, namely a longitudinal power member 8', a left power member 8", and a right power member 8''', for example.

Independently of the embodiment, the control lever 10 includes a stick 11 extending axially from a stand 11' towards grip means 11" at a minimized height H that enables the control lever to be arranged on one side relative to a pilot. The stick is thus a "mini-stick".

The stick 11 is hinged by a carrier structure 20 about a first hinge axis AX1 and about a second hinge axis AX2, which axes are mutually orthogonal, the carrier structure being fastened to a point in the aircraft cockpit.

Thus, the pilot can operate the stick 11 in a first tilting direction B1 by causing the stick 11 to pivot about the first hinge axis AX1 in order to control the aircraft in roll, the pilot being able to operate the stick 11 in a second tilting direction B2 by causing the stick 11 to pivot about the second hinge axis AX2 in order to control the aircraft in pitching.

The pilot may also operate the stick 11 to obtain a movement that is the result of pivoting about both of the first and second hinge axes AX1 and AX2.

Furthermore, the control lever 10 includes phasing means 30 constrained to move in rotation with the stick 11 about both the first hinge axis AX1 and the second hinge axis AX2, the phasing means 30 thus being movable in pivoting about the first hinge axis AX1 and about the second hinge axis AX2.

The phasing means 30 include one main arm (not visible in FIG. 1) for each power member, each main arm being mechanically linked with one power member.

The function of the phasing means is to control the power members by transforming a pure order into a composite order that is given to each power member.

Under such circumstances, the phasing means form a portion of the control lever. Consequently, the phasing means do not give rise to the friction forces that are to be observed in certain prior art systems between the phasing means and a support, with the phasing means in the present invention being integrated in the control lever.

It should be observed that a mixing unit 9 may be arranged between the control lever 10 and the power members 8.

Consequently, the phasing means 30 of the control lever 10 are connected to the mixing unit 9 by one primary linkage 91, 92, 93 per primary arm in order to connect each primary arm to the mixing unit 9, the mixing unit 9 being connected to each power member 8', 8", 8''' via one secondary linkage 94, 95, 96 per power member 8', 8", 8'''.

The primary and secondary linkages may include connecting rods, actuators arranged in series or in parallel with said connecting rods, a control block for an autopilot system, and deflector means of bellcrank or equivalent type, for example.

Furthermore, the control system 5 may include a control member 200 for controlling the collective pitch of the blades by acting on the mixing unit 9.

In addition to the main arms, the phasing means 30 may also include two secondary arms (not shown in FIG. 1) for interlinking the movements of the control lever 10 with an additional lever 100 via a first interlinking system 110 and via a second interlinking system 120.

A movement of the control lever 10 then causes the additional lever 100 to move identically, and vice versa.

In addition, in the first embodiment shown in FIG. 1, the phasing means 30 are fastened to the stand 11' of the stick 11.

Figure 2:
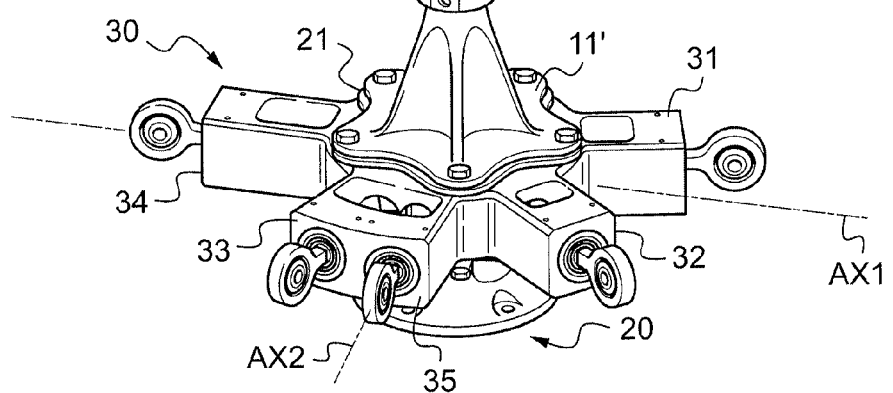
FIG. 2 is an isometric view of a control lever in a second embodiment.

With reference to FIG. 2, in a second embodiment, the phasing means 30 are fastened to a movable portion 21 of the carrier structure 20.

Figure 4:
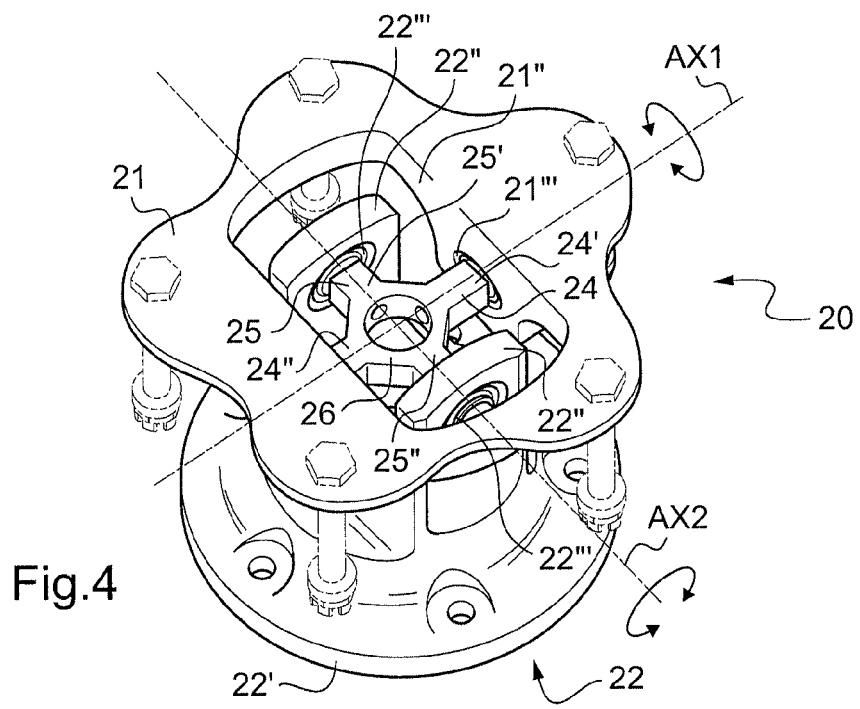
FIG. 4 is a view showing a carrier structure.

As can be seen with reference to FIG. 4, the carrier structure 20 has a movable portion 21 that is movable about the first hinge axis AX1 and about the second hinge axis AX2, and also a stationary portion 22 that is fastened to a point in the cabin of an aircraft.

The carrier structure 20 is then provided with a hinge connecting the movable portion 21 to the stationary portion 22, this hinge including link means 23 of the spider type. The link means 23 are provided with a first shaft 24 that is elongate along the first hinge axis AX1 and with a second shaft 25 that is elongate along the second hinge axis AX2.

Each shaft 24 and 25 has two distinct extreme portions 24' & 24" and 25' & 25" that are connected together by a perforated central portion 26.

Consequently, the movable portion has a first plate 21' carrying two first cheeks 21", each end portion of the first shaft 24 co-operating with a first ball or roller bearing 21''' that is arranged in each first cheek. Each first ball or roller bearing 21''' is contained in a plane perpendicular to the first hinge axis AX1, and thus perpendicular to the first shaft 24, and the movable portion is thus free to pivot about the first hinge axis AX1.

Similarly, the stationary portion has a second plate 22' carrying two second cheeks 22", each end portion of the second shaft 25 co-operating with a second ball or roller bearing 22''' arranged in each second cheek. Each second ball or roller bearing 22''' is contained in a plane perpendicular to the second hinge axis AX2, and as a result to the second shaft 25, and the movable portion 21 is thus free to pivot about the second hinge axis AX2 relative to the stationary portion 22, together with the first hinge axis AX1 and thus with the first shaft 24.

With reference to FIG. 2, and independently of the embodiment, the phasing means 30 comprise one main arm 31, 32, 33 per power member.

By way of example, the first main arm 31 may be connected to a front power member 8', and may be separated by an angle of 60° from a second main arm 32 that is connected, for example, to a left power member 8''. Similarly, the second main arm 32 may be separated by an angle of 60° from a third main arm 33, e.g. connected to a right power member 8'''.

As a variant, the main arms are equally distributed, with any two adjacent main arms being separated by an angle of 120° when the three power members are in use.

Furthermore, the phasing means may include two mutually orthogonal interlinking secondary arms 34 and 35 for associating with an additional control lever 100.

The first secondary arm 34 is directed along the first hinge axis AX1 for interlinking the control lever 10 with an additional lever 100 during a pitching movement of either one of said levers, while a second secondary arm 35 is directed along the second hinge axis AX2 to interlink the control lever 10 with an additional lever 100 during a roll movement of either one of said levers.

Figure 3:
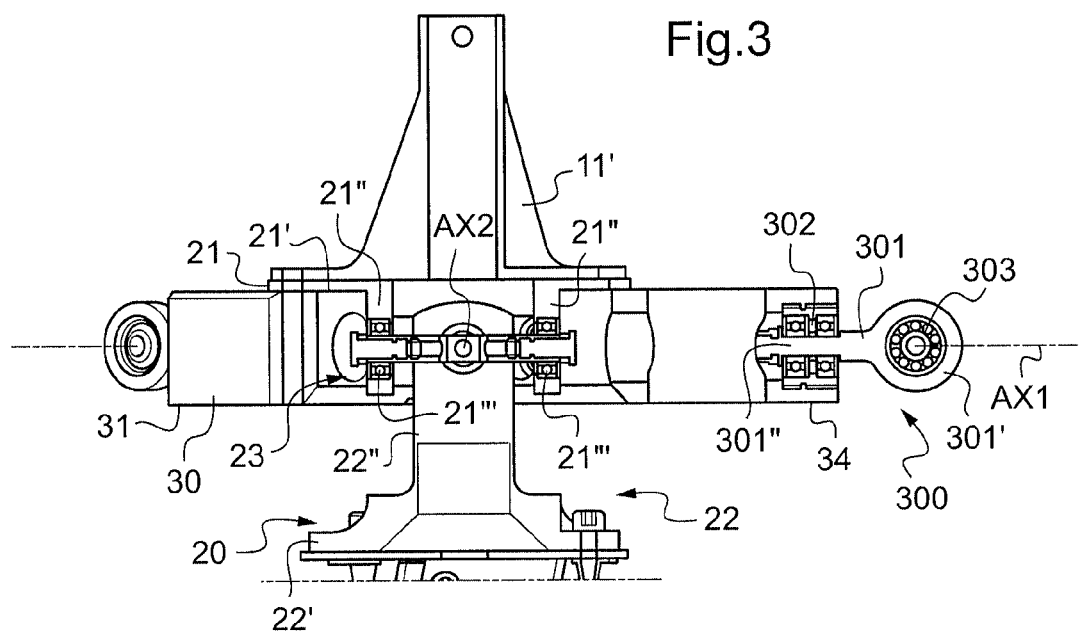
FIG. 3 is a section of the control lever in a second embodiment.

With reference to FIG. 3, each arm may include a hinge 300 for connecting to a linkage. Such a hinge comprises an endpiece 301 having a ball or roller bearing 303 in a distal zone 301' for connection to a linkage, said endpiece co-operating via a proximal zone 301'' with at least one ball or roller bearing 302 arranged in an arm.

Figure 5:
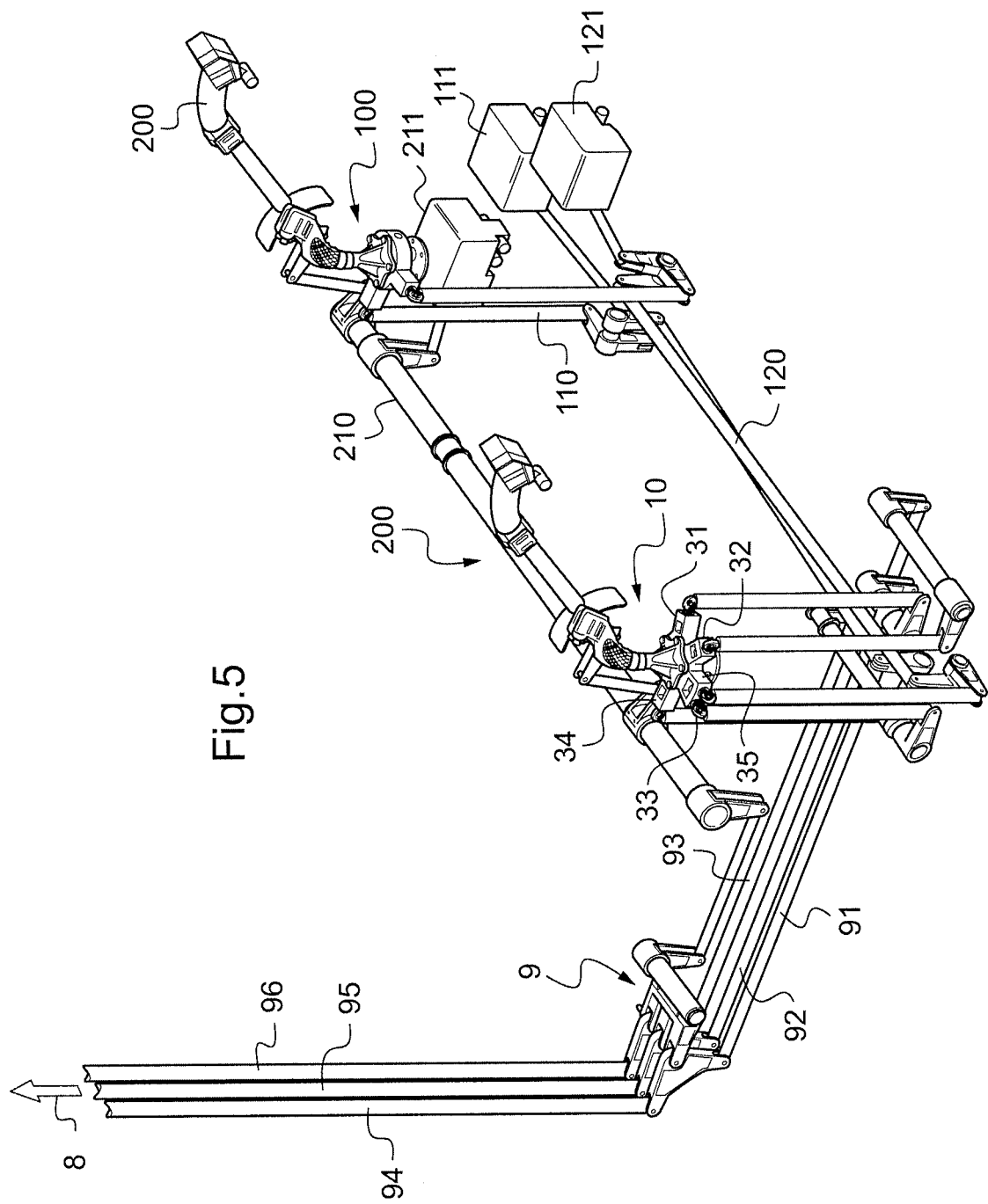
FIG. 5 is an isometric view of a control system in a second embodiment.

FIG. 5 is an isometric view of a control system in a second embodiment.

As shown in FIG. 5, the control system 5 may include an assistance system. For example, the first interlinking system 110 may include a first assistance system 111, and the second interlinking system 120 may include a second assistance system 121.

Similarly, a third interlinking system 210 connecting together two collective pitch control members may possess an assistance system 211.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

The invention claimed is:

1. A control lever provided with a stick extending axially from a stand towards grip means and with a carrier structure for said stick that is hinged about a first hinge axis (AX1) and about a second hinge axis (AX2), wherein the control lever includes phasing means constrained to move in rotation with said stick about said first hinge axis (AX1), about said second hinge axis (AX2), and about a combination thereof, said phasing means comprising at least three radially extending main arms so that each main arm can control a respective power member that is connected to a set of swashplates for controlling a rotary wing.

2. A control lever according to claim 1, wherein said phasing means include two mutually orthogonal interlinking secondary arms for associating with an additional control lever.

3. A control lever according to claim 2, wherein a first secondary arm extends along the first hinge axis (AX1), with a second secondary arm extending along the second hinge axis (AX2).

4. A control lever according to claim 1, wherein said carrier structure comprises a movable portion and a stationary portion connected together by means of a link comprising a first shaft and a second shaft, which shafts are mutually orthogonal, the first shaft extending along the first hinge axis (AX1) and being hinged to the movable portion, and the second shaft extending along the second hinge axis (AX2) and being hinged to the stationary portion.

5. A control lever according to claim 1, wherein said phasing means are fastened to said stand.

6. A control lever according to claim 1, wherein said stand is fastened to a movable portion of said carrier structure, and said phasing means are fastened to said movable portion.

7. A mechanical control system comprising a set of control swashplates suitable for being connected by pitch rods to blades of a rotary wing, said control system comprising a cyclic control lever for controlling a plurality of power members connected to said set of control swashplates, the control lever being provided with a stick extending axially from a stand towards grip means and a carrier structure carrying said stick hinged about a first hinge axis (AX1) and about a second hinge axis (AX2), wherein said control lever is a lever according to claim 1 including phasing means constrained to move in rotation with said stick about said first hinge axis (AX1), about said second hinge axis (AX2), and about a combination thereof, said phasing means having at least three main arms, each controlling a power member.

8. A mechanical control system according to claim 7, wherein said control system is provided with a control lever operable by a first pilot and with an additional lever operable by a second pilot, and said phasing means includes two mutually orthogonal interlinking secondary arms for associating with two orthogonal members of the additional control lever respectively via a first interlinking system and via a second interlinking system.

9. A mechanical control system according to claim 8, wherein at least one of said interlinking systems includes an assistance system.

10. A mechanical control system according to claim 7, including a mixing unit connected to said control lever via one primary linkage per primary arm for connecting each primary arm to the mixing unit, said mixing unit being connected to each power member via one secondary linkage per power member.

11. A mechanical control system according to claim 10, including a collective pitch control member connected to said mixing unit.

12. An aircraft provided with a rotary wing having a plurality of blades, wherein the aircraft includes a control system for controlling the pitch of the blades in accordance with claim 7.

13. A cyclic control system for controlling a plurality of power members connected to a set of control swashplates, the control system comprising:

a carrier structure having a stationary portion and a movable portion, the movable portion hinged about a first hinge axis (AX1) and about a second hinge axis (AX2);

a control lever supported by the carrier structure, the control lever comprising a stick extending axially from a stand, the stick having grip means; and a phasing element comprising at least three radially extending main arms, each main arm mechanically linked to and configured to control a respective power member connected to a set of swashplates to control a rotary wing;

wherein the phasing element and the control lever are constrained together and move in rotation with one another about the first hinge axis (AX1), about the second hinge axis (AX2), and about a combination thereof.

14. The cyclic control system of claim 13 wherein the phasing element further comprises two secondary arms for associating with an additional control lever, the two secondary arms being orthogonal.

15. The cyclic control system of claim 13 wherein the movable portion and the stationary portion of the carrier structure are connected together by a link, the link having a first shaft extending along the first hinge axis (AX1) and a second shaft connected to the first shaft and extending along the second hinge axis (AX2), wherein the first and second shafts are orthogonal, wherein the first shaft is hinged to the movable portion and the second shaft is hinged to the stationary portion.

16. The cyclic control system of claim 15 wherein the movable portion of the carrier structure, the phasing element, and the control lever are connected to one another and are constrained to move together.

17. The cyclic control system of claim 15 wherein the phasing element is positioned between the carrier structure and the control lever.

18. The cyclic control system of claim 15 wherein the first shaft connects the movable portion of the carrier structure to the second shaft, and wherein the second shaft connects the first shaft to the stationary portion of the carrier structure.

19. The cyclic control system of claim 13 wherein each of the three main arms have an end region spaced apart from the control lever, each of the end regions having a hinge adapted to connect to a corresponding linkage.

20. The cyclic control system of claim 13 wherein the three main arms are separated from one another by an angle of at least 60 degrees.

* * * * *